United States Patent
Fukuda et al.

(10) Patent No.: US 7,227,906 B2
(45) Date of Patent: Jun. 5, 2007

(54) RADIO COMMUNICATION METHOD AND APPARATUS FOR MULTIPLEX TRANSMISSION OF PLURAL SIGNALS IN THE SAME FREQUENCY BAND

(75) Inventors: Atsushi Fukuda, Yokohama (JP); Yasunori Suzuki, Yokohama (JP); Noriyoshi Terada, Yokosuka (JP); Toshio Nojima, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 806 days.

(21) Appl. No.: 10/315,993

(22) Filed: Dec. 11, 2002

(65) Prior Publication Data
US 2003/0123565 A1 Jul. 3, 2003

(30) Foreign Application Priority Data
Dec. 12, 2001 (JP) ............................. 2001-379146

(51) Int. Cl.
*H04L 1/02* (2006.01)
(52) U.S. Cl. ...................................................... 375/267
(58) Field of Classification Search ................ 375/267, 375/295, 260, 259, 299, 302, 303, 307, 316, 375/340, 346, 347, 348, 349, 350, 377; 455/91, 455/101, 130, 132, 39, 500; 370/310
See application file for complete search history.

(56) References Cited
U.S. PATENT DOCUMENTS 5,323,459 A * 6/1994 Hirano ........................ 379/391
5,640,146 A * 6/1997 Campana, Jr. ............ 340/573.4
5,710,797 A * 1/1998 Segal et al. .................. 375/346
6,205,166 B1 * 3/2001 Maruta et al. ............... 375/130
6,714,608 B1 * 3/2004 Samueli et al. ............. 375/344
6,999,538 B2 * 2/2006 Kung et al. .................. 375/347

FOREIGN PATENT DOCUMENTS

| EP | 0 674 455 | 9/1995 |
| EP | 0 793 360 | 9/1997 |
| EP | 1 179 893 | 2/2002 |
| JP | 11-275047 | 10/1999 |
| JP | 2001-177439 | 6/2001 |
| WO | WO 01/69815 | 9/2001 |

OTHER PUBLICATIONS

C Ung, et al., IEEE Antennas and Propagation Society International Symposium, vol. 1 of 4, pp. 422-425, XP-010564518, "A Space Division Multiple Access Receiver", Jul. 8, 2001.

* cited by examiner

Primary Examiner—Pankaj Kumar
(74) Attorney, Agent, or Firm—Oblon, Spivak, McClelland, Maier & Neustadt, P.C.

(57) ABSTRACT

Different carrier frequencies are chosen for plural transmitters of a transmitting device and signals are transmitted at frequency bands overlapping each other. In the receiving device weighting coefficients are provided in input-to-output paths of an interchannel interference canceller 21 so that the cross correlation between output signals from the interchannel interference canceller is minimized.

12 Claims, 14 Drawing Sheets

RADIO COMMUNICATION METHOD AND APPARATUS FOR MULTIPLEX TRANSMISSION OF PLURAL SIGNALS IN THE SAME FREQUENCY BAND

BACKGROUND OF THE INVENTION

The present invention relates to a radio communication method and apparatus for multiplex transmission of plural signals in the same frequency band by use of a transmitting device composed of plural transmitters and a receiving device composed of plural receivers.

The realization of high-speed transmission as for video delivery in future mobile radio communications calls for a radio communication scheme of high frequency utilization efficiency. The frequency utilization efficiency is commonly defined by the ratio of traffic volume and the spectrum space used. What is meant by the "spectrum space used" is the product of the frequency bandwidth used, the dimension of the physical space occupied and the time consumed. To raise the frequency utilization efficiency, there are proposed mainly three schemes: (1) To increase the amount of information to be transmitted per unit frequency; (2) To reduce the cell radius to increase the number of reusable frequencies; and (3) To increase the number of usable frequencies per band by interleave channel assignment.

For example, in a digital modulation system, the amount of information transmitted per unit frequency can be increased by making transmission signals multilevel. An example of this scheme is an application of 16 QAM (Quadrature Amplitude Modulation) to 256 QAM in fixed microwave transmission. An example of reduction of the frequency bandwidth is an interleave channel assignment in mobile communications. An example of reduction of the physical space is the implementation of microcells in PHS (Personal Handyphone System). An example of reduction of the time used is the implementation of a half-rate speech coding based on full-rate speech coding in PDC (Personal Digital Cellular).

Various radio transmission techniques as described above are combined to enhance the frequency utilization efficiency. For example, PDC multiplexes three or six speech channels in a 3-sector 1-carrier frequency system by the combined use of such techniques as frequency assignment by the sector cell system, high-efficiency speech coding, a time division multiple access system and so forth.

The frequency utilization efficiency can be increased simply by closely spacing the frequency bands for use plural transmitters, but as the bands overlap more and more, signal separation becomes harder, resulting in increased interference and hence degrading the speech quality.

SUMMARY OF THE INVENTION

It is therefore an object of the present invention to provide a radio communication method and apparatus which enable the receiving side to separate all transmitted signals from received signals even if plural signals are transmitted from a transmitting device having plural transmitters and then multiplexed in the space.

According to the present invention, in a radio communication method which achieves high frequency utilization efficiency by separating signals through utilization of a low cross correlation between propagation characteristic of transmission signals, the signals are transmitted at different frequencies with the frequency bands overlapping each other and so that the cross correlation between the signals is reduced. The transmitted signals are received by the space diversity system and are separated. Since, the cross correlation between the transfer characteristic of the transmission signals is reduced, even if the transmitting antennas are closely spaced, the signals can be separated at the receiving side. Furthermore, transmission signals which have low cross correlation of the transfer characteristic between transmission channels of plural transmitting devices are multiplexed at the same carrier frequency to perform multiple access.

According to a first aspect of the present invention, in plural transmitters of a transmitting device, different information sequences are modulated and simultaneously transmitted by carriers of different frequencies from transmitting antennas with transmission signal bands of respective channels overlapping each other.

According to a second aspect of the present invention, transmitting-station equipment is composed of plural similarly configured transmitting devices. In this instance, plural information sequences to be transmitted from the transmitting devices all differ, and the cross correlation between transfer characteristics of the signals to be transmitted at the same carrier frequency from each transmitting device is reduced.

According to a third aspect of the present invention, a set of different carrier frequencies for use in each transmitting device of the transmitting-station equipment is the same as a set of carrier frequencies for use in other transmitting devices.

According to a fourth aspect of the present invention, in each transmitting device of the transmitting-station equipment the information sequences to be transmitted from the plural transmitters are encoded using different orthogonal codes.

According to a fifth aspect of the present invention, in each transmitting device of the transmitting-station equipment the information sequences to be transmitted from the plural transmitters are each encoded using an error correcting code.

According to a sixth aspect of the present invention, there is provided a radio communication method according to which: array antenna elements of about the same number as that of transmitters are provided; receivers of about the same number as that of the transmitters are provided; transmission signals from transmitting equipment which have a low cross correlation between their transfer characteristics are multiplexed at the same carrier frequency band and received by space diversity; all information sequences is reduced; and signal separation is performed by an interchannel interference canceller in the receiving device.

According to a seventh aspect of the present invention, interchannel interference cancel means divides received signals from respective receiving antenna elements, then multiplies them by weighting coefficients, and combines the weighted signals. The weighting coefficients are each adaptively controlled in such a manner as to minimize the correlation between respective combined output signals. The optimization of the controlled weighting coefficients achieves minimization of the interchannel interference. By this, different information sequences from plural transmitting devices can be multiplexed at the same carrier frequency band.

According to an eighth aspect of the present invention, the transmitted signals are restored by correlation detection of received signals using respective orthogonal codes in the receiving device. This provides increased accuracy in the detection of signals components of the respective information sequences including an imperfection in the interchannel interference canceller.

According to an ninth aspect of the present invention, the receiving device uses decoders corresponding to error correcting codes used at the transmitting side. This improves the accuracy of detecting the signal component of each information sequence.

According to a tenth aspect of the present invention, to reduce the cross correlation between received signals by receiving array antenna when transmitters are closely spaced, the frequency correlation is reduced by using different carrier frequencies for adjacent transmission channels. This enhances the accuracy of signal separation in the receiving device. Accordingly, it is possible to provide a radio communication method which multiplexes signals at adjacent and overlapping frequency bands and separates all the information sequences in the receiving device.

According to an eleventh aspect of the present invention, there is provided a radio communication method according to which: signals of overlapping bands but low frequency correlation are transmitted from each transmitting device; signals low in the cross correlation between their transfer characteristics are multiplexed at the same carrier band and received by space diversity; and signal separation is performed by an interchannel interference canceller in the receiving device.

According to a twelfth aspect of the present invention, a training sequence is sent from the transmitting side for initial convergence of a weighting coefficient of each interchannel interference cancel means.

According to a thirteenth aspect of the present invention, to enhance the accuracy of separation of the same channel interference signals in the receiving device, the transmission signals are each multiplied by one of orthogonal codes at the transmitting side, and at the receiving side, correlation detection of the corresponding orthogonal code is performed.

According to a fourteenth aspect of the present invention, to enhance the accuracy of separation of the same channel interference signals in the receiving device, the transmission signals are each encoded into an error correcting code, and at the receiving side, they are decoded by decoders.

DETAILED DESCRIPTION OF THE PREFERRED EMBODIMENTS

Figure 1:
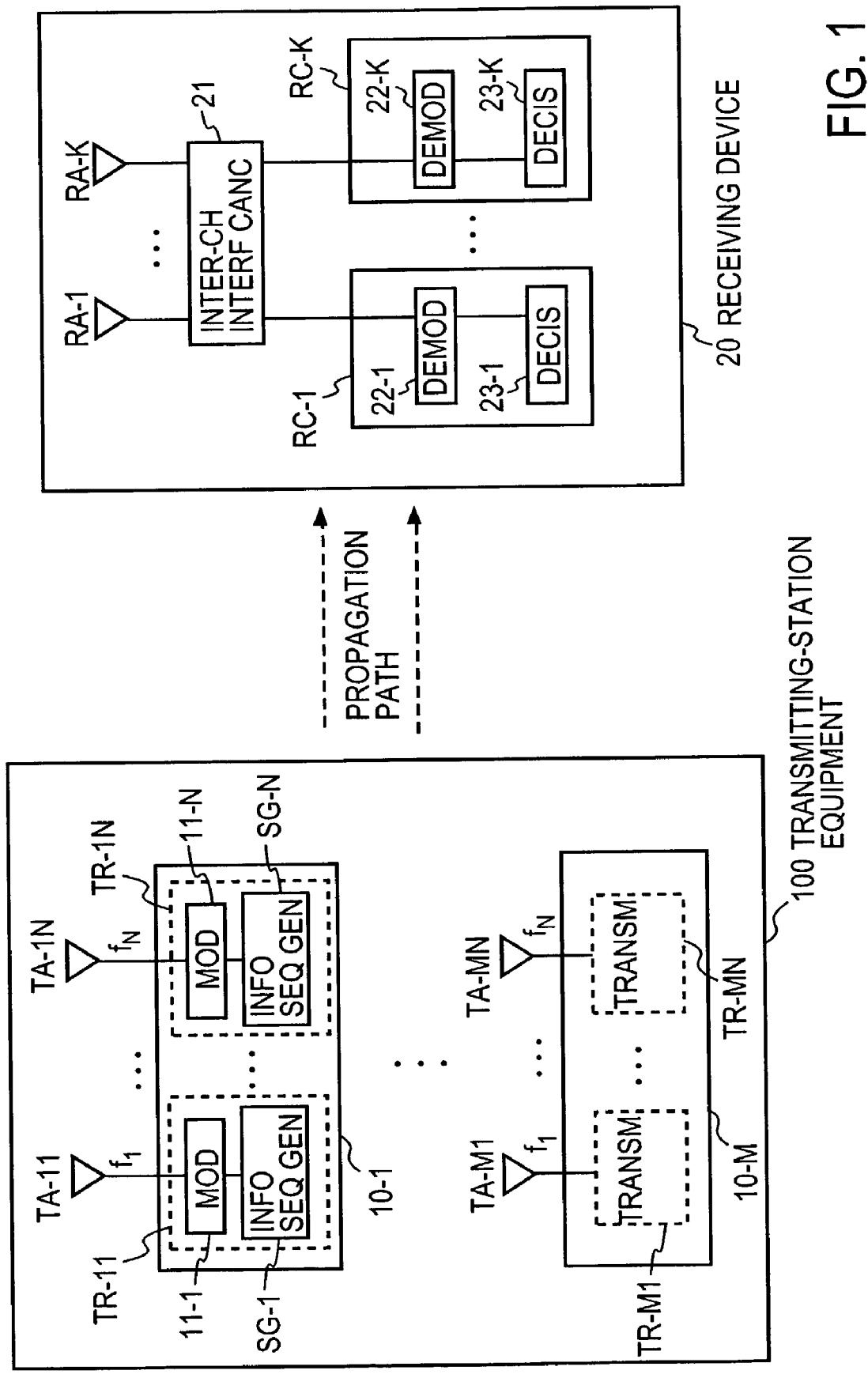
FIG. 1 is a block diagram depicting a basic configuration of the present invention.

In FIG. 1 there is depicted in block form a basic configuration of the present invention. Transmitting-station equipment 100 is shown to use M (where M is an integer equal to or greater than 1) transmitting devices 10-1 to 10-M each composed of N (where N is an integer equal to or greater than 2) transmitters TR-m1 to TR-mN (where m=1, ..., M). The transmitting side in its entirety needs only to have at least two transmitters; accordingly, the above-mentioned N may be set to an integer equal to or greater than 1 and M an integer equal to or greater than 1, provided that N and M do not assume 1, simultaneously. Each transmitters TR-mn (where m=1, ... M, and n=1, ... N) is provided with an information sequence generator SG-n for generating an information sequence to be transmitted and a modulator 11-$n$ for modulating the information sequence. Incidentally, let it be assumed that N×M=K information sequences in all differ from one another. Further, assume that the transmitters TR-1n to TR-Mn of the transmitting devices 10-1 to 10-M which bear the same number n transmit the information sequences at the same carrier frequency $f_n$. In the FIG. 1 example each transmitting device 10-$m$ (where m=1, ..., M) has N transmitting antennas TA-m1 to TA-mN, and transmits modulated carriers from the transmitters TR-m1 to TR-mN corresponding thereto.

Assume, for example, that the transmitter TR-11 of the transmitting device 10-1 and the transmitter TR-M1 of the transmitting device 10-M use the same carrier frequency $f_1$. In each transmitting device 10-$m$ the transmitters TR-m1 to TR-mN transmit signals of different carrier frequencies $f_1$ to $f_N$, and the transmission signal bands for the transmitters TR-m1 and TR-mN each overlap the transmission signal band of at least one of the other transmitters.

A receiving device 20 comprises an array antenna having M×N elements RA-1 to RA-K (where K=M×N), an interchannel interference canceller 21 and K=M×N receivers RC-1 to RC-K. Each receiver RC-k (where k=1, ..., K) is made up of a modulator 22-$k$ for demodulating one of separated received signals, and a decision device 23-$k$ for making decision on the demodulated signal to regenerate the original information sequence. Since each transmitting device 10-*m* usually corresponds to one user, the transmitting devices are spaced sufficiently apart. Generally speaking, an increase in the spacing of the transmitting and receiving antennas reduces the cross correlation of transfer characteristics which are uniquely determined between the respective transmitting and receiving antennas, allowing ease in separating the received signals. Hence, the receiving antenna elements in the receiving device 20 are properly spaced apart.

The interchannel interference canceller 21 is supplied with received signals from the receiving array antenna elements RA-1 to RA-K. The received signals each have M transmission signals multiplexed around the same center frequency. The interchannel interference canceller 21 cancels interchannel interference by processing the received signals from the antenna elements RA-1 to RA-K in such a manner as to minimize the cross correlation between the output signals of the inter-channel interference canceller. This permits separation of the transmission signals from all the transmitters which contain information sequence components. The separated received signals are each demodulated by the demodulator 22-*k* of one of the receivers RC-1 to RC-K, and discriminated by the discriminator 23-*k* to regenerate the original information sequence.

Figure 2:
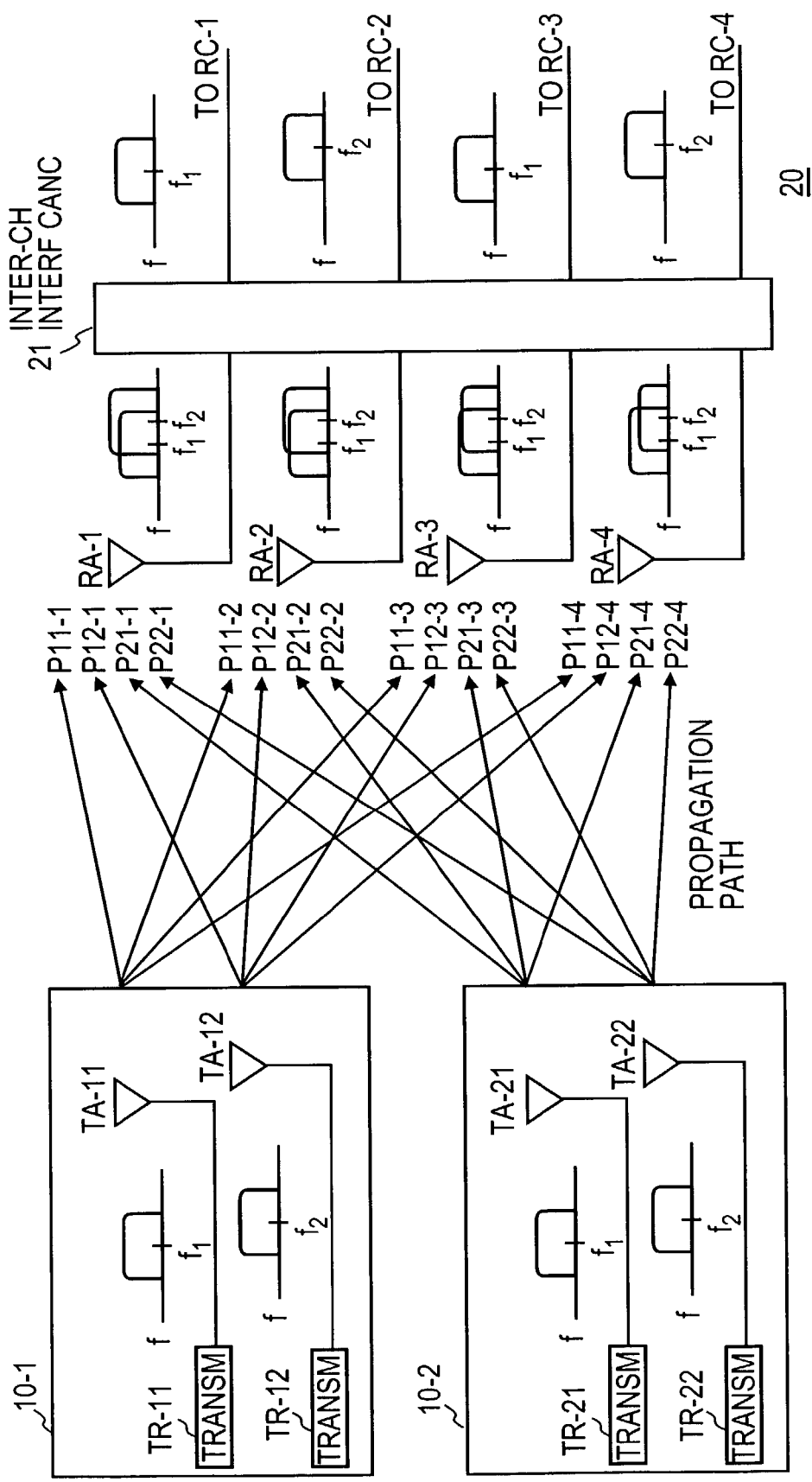
FIG. 2 is a block diagram for explaining the operating principles of the present invention.

Referring next to FIG. 2, the principle of signal separation will be described concretely. The following description will be given on the assumption that M=2 for the sake of brevity, but it may be set at an arbitrary integer equal to or greater than 1. Reference numerals P11-1, P11-2, P11-3 and P11-4 denote paths from the transmitting antenna TA-11 of the transmitting device 10-1 to the receiving antenna elements RA-1 to RA-4, respectively. Reference numerals P12-1, P12-2, P12-3 and P12-4 denote paths from the transmitting antenna TA-12 of the transmitting device 10-1 to the receiving antenna elements RA-1 to RA-4, respectively, Similarly, paths from the transmitting device 10-2 are denoted by P21-1 to P21-4 and P22-1 to P22-4.

The N transmitting antennas TA-m1 to TA-mN of each transmitting device 10-*m* transmit signals at different carrier frequencies. The propagation characteristic is expressed as an impulse response of the propagation path, which is a function of frequency. Accordingly, propagation characteristics of the signals transmitted at different carrier frequencies usually differ from each other. When transmitted signals of different propagation characteristics are received by the antenna, the receiving levels vary differently. The cross correlation between the received signals corresponding to each transmitted signal is called frequency correlation. The frequency correlation decreases with an increase in the carrier frequency difference between the two transmitted signals concerned. That is, different carrier frequencies of transmitters reduce the frequency correlation, causing a decrease in the cross correlation between signals received by the receiving array antenna. This permits adjacent placement of transmitting antennas.

For example, in a line-of-sight communication, when the transmitting antennas TA-11 and TA-12 in the same transmitting device 10-1 spaced the half-wave length apart transmit signals at the same carrier frequency over the paths P11-1 and P12-1, the correlation between two received signals by the receiving antenna RA-1 becomes very high. In this instance, however, the cross correlation between the received signals could be reduced by choosing a proper carrier frequency difference between the two transmission signals with a view to decreasing the frequency correlation between the received signals. Since carrier frequencies of the plural transmitters differ in each transmitting device, the number of antennas may be reduced by combining transmission signals for each certain number of transmitters for application to one transmitting antenna.

Further, the M transmitting devices are spaced apart. The cross correlation in propagation characteristic between the signals transmitted from different transmitting devices is generally low. Accordingly, the use of the same carrier frequency for different transmitting devices permits multiplex transmission therefrom of plural signals at the same carrier frequency band.

Let $f_1$ and $f_2$ represent the carrier frequencies of the transmitters TR-m1 and TR-m2 of each transmitting device 10-*m* (where m=1, 2), respectively. The spectrum of the signal transmitted from each transmitting antenna and the spectrum of the signal received by each receiving antenna element are shown adjacent the respective antennas in FIG. 2. All the transmission signals are transmitted over respective propagation paths and received by the receiving antenna elements RA-1 to RA-4. The transmission signals from the transmitting antennas TA-11 and TA-21 are multiplexed at the band of the center frequency $f_1$. Similarly, the transmission signals from the transmitting antennas TA-12 and TA-22 are multiplexed at the band of the center frequency $f_2$. Further, band signals of the carrier frequencies $f_1$ and $f_2$ are transmitted with their spectrums partly superimposed on each other.

In the receiving device 20 each received signal undergoes the following signal processing for interchannel interference cancellation and signal components of respective information sequences are separated. The principle of this operation will be described below with reference to FIG. 3.

For brevity sake, the description will be given of a system which employs two transmitting devices, one transmitter in each transmitting device, two receiving antenna elements and two receivers, but the present invention is not limited specifically thereto. Letting an attenuation coefficient and phase coefficient of the path ij between the transmitting antenna and the receiving antenna element concerned be represented by $a_{ij}$ and $\theta_{ij}$, the transfer function of each path is given by the following equation.

$$p_{ij} = a_{ij} e^{j\theta_{ij}} \quad (1)$$

Letting the transmission signal sequence, the received signal sequence and a matrix of the path from the transmitting antenna to the receiving antenna be represented by x, y and P, respectively, $$y = Px \quad (2)$$

$$x = (x_1 x_2)^T \quad (3)$$

$$y = (y_1 y_2)^T \quad (4)$$

$$P = \begin{pmatrix} p_{11} & p_{21} \\ p_{12} & p_{22} \end{pmatrix} \quad (5)$$

In the interchannel interference canceller 21, let $w_{11}$ represent a weighting coefficient of the path from the receiving antenna element RA-1 to the receiver RC-1, $w_{12}$ a weighting coefficient of the path from the receiving antenna element RA-2 to the receiver RC-2, $w_{21}$ a weighting coefficient of the path from the receiving antenna element RA-2 to the receiver RC-1, $w_{22}$ a weighting coefficient of the path from the receiving antenna element RA-2 to the receiver RC-2, and W a weighting coefficient matrix. Letting a receiver input signal sequence be represented by z, $$z = Wy \quad (6)$$

$$W = \begin{pmatrix} w_{11} & w_{21} \\ w_{12} & w_{22} \end{pmatrix} \quad (7)$$

$$z = (z_1 z_2)^T \quad (8)$$

From Equations (2) and (6), $$z = WPx = \begin{pmatrix} p_{11}w_{11} + p_{21}w_{12} & p_{11}w_{21} + p_{21}w_{22} \\ p_{12}w_{11} + p_{22}w_{12} & p_{12}w_{21} + p_{22}w_{22} \end{pmatrix} \begin{pmatrix} x_1 \\ x_2 \end{pmatrix} \quad (9)$$

Here, if the matrix W is available which makes the matrix WP of Equation (9) a diagonal matrix, it is possible to cancel interchannel interference in the path between the transmitting antenna and the receiving antenna. That is, by determining the weighting coefficients $w_{11}$, $w_{12}$, $w_{21}$ and $w_{22}$ so that non-diagonal elements of the matrix become $$p_{11}w_{21} + p_{21}w_{22} = 0$$

$$p_{12}w_{11} + p_{22}w_{12} = 0 \quad (10)$$

the transmitted N-channel signals can be separated into original signals. The present invention diagonalizes the matrix WP by manipulating the weighting coefficient matrix W.

The weighting coefficient matrix W is adaptively controlled by using estimated transfer characteristics. As an algorithm for adaptive control of the matrix W, it is possible to use a zero-forcing, least square error, or similar criterion. These algorithms are commonly used for adaptive signal processing; in the present invention, too, they can similarly be used for signal processing. A description will be given of a method which uses a training signal as each transmission signal for initial convergence of the matrix W and updates the matrix W by the adaptive algorithm.

Known signal sequences (training signals) are separately transmitted, as transmission signals for weighting coefficient setting use, from the respective transmitters TR-1 and TR-2 to the antennas TA-1 and TA-2 and are received by the receivers RC-1 and RC-2, after which the weighting coefficient matrixes W are collectively calculated.

Step 1: In the first place, coefficient initial values of coefficient multipliers 21W11 to 21W22 are represented by $$w_{11}^{(0)} \text{ to } w_{22}^{(0)},$$

and, for example, a 1 is set in each diagonal component $w_{ij}^{(0)}$, where i=j, and a 0 is set in each non-diagonal component $$w_{ij}^{(0)},$$

where i≠j.

Step 2: Known training sequences $(x_1, x_2, \ldots)$ sequentially transmitted from the transmitters TR-1 and TR-2 are received by the receiving antenna element elements RA-1 and RA-2, and a transfer function matrix $P = (p_{11}, \ldots, p_{22})$ is obtained. More specifically, only the transmitter TR-1 transmits a signal first, and the receiving antenna elements RA-1 and RA-2 receives the transmitted signal. In the coefficient multipliers 21W11, ..., 21W22 there are set the diagonal component $$w_{ij}^{(0)} = 1,$$

where i=j, and the non-diagonal component $$w_{ij}^{(0)} = 0,$$

where i≠j. Accordingly, the signals received by the receiving antenna elements RA-1 and RA-2 are detected intact by the receivers RC-1 and RC-2 without being combined each other. Let the signal transmitted from the transmitter TR-1 and received by the receiving antenna element RA-j be represented by $y_{1j}$. Px=y and an estimated transfer function P' is adaptively determined in such a manner as to minimize an error between a replica P'x calculated from the function P' and the training signal x and the received signal $y_{1j}$, by which is obtained estimated transfer function values $p'_{11}$ and $p'_{22}$ for the training signal x.

Next, a training signal is transmitted from the transmitter TR-2 and an estimated matrix P' of the transfer function matrix P is similarly converged for the received signal $y_{2j}$. By this, the following estimated transfer function matrix P' is obtained.

$$P' = \begin{pmatrix} p'_{11} & p'_{12} \\ p'_{21} & p'_{22} \end{pmatrix} \quad (11)$$

The matrix P' thus obtained is an estimated matrix of the transfer function of the path from the respective transmitters to the respective receiving antenna elements. When the estimated matrix P' is ideal, P'=P.

Step 3: Assuming that the estimated matrix P' is ideal, an inverse matrix of the transfer function matrix P in which the matrix WP in Equation (9) is a unit matrix is calculated. Since the matrix in this example is, for example, a 2-by-2 matrix, the following matrix is obtained.

$$W = P^{-1} = \frac{1}{p_{11}p_{22} - p_{21}p_{12}} \begin{pmatrix} p_{22} & -p \\ -p_{21} & p_{11} \end{pmatrix} \quad (12)$$

It can be seen that the transmission signals $x_1$ and $x_2$ can completely be separated in the receiving device theoretically by determining the diagonalized matrix W as described above.

For receiving the information sequence signals after the training sequence, the weighting coefficients $w_{11}$ to $w_{22}$ obtained from the estimated transfer function of the propagation path, obtained by the reception of the training sequence, are used as initial values, and the weighting coefficients $w_{11}$ to $w_{22}$ are updated by an adaptive algorithm through use of the demodulated result (decoded result) as a reference signal, and the updated coefficients are set in the multipliers 21W11 to 21W22 of the interchannel interference canceller 21, respectively. During receiving the information sequence signals the weighting coefficient $w_{11}$ to $w_{22}$ may also be updated, for instance, at regular time intervals by an adaptive algorithm using a training signal or the demodulated results (decoded results) by the receivers RC-1 and RC-2.

Figure 3:
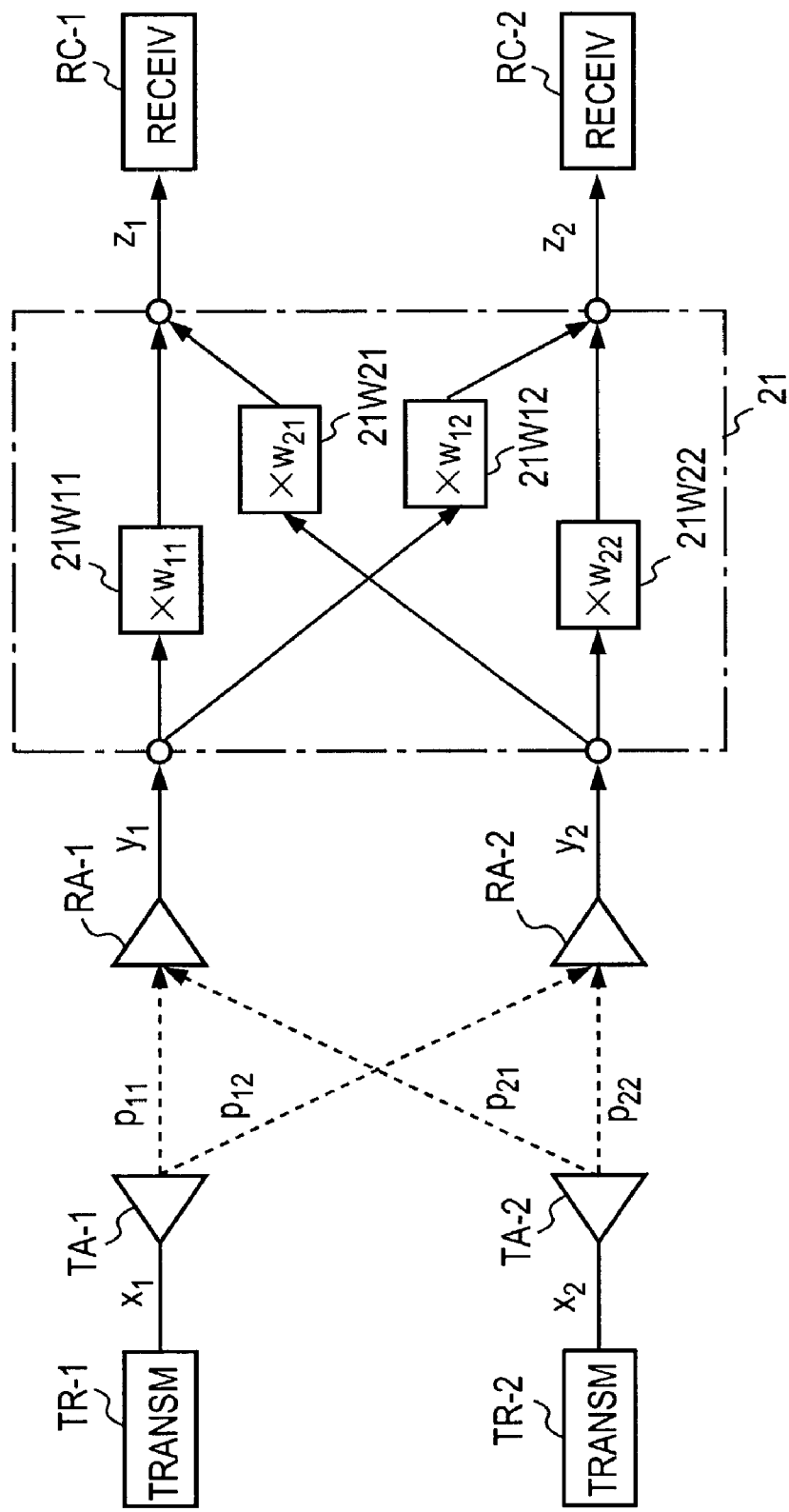
FIG. 3 is a block diagram for explaining the operation of an interchannel interference canceller in the present invention.

It must be noted here that the basic configuration of FIG. 3 does not impose any limitations on the transmitting carrier frequencies of the transmitters since the signals are transmitted from transmitting antennas at different positions. That is, the two transmitters TR-1 and TR-2 use the same frequency, but since the two transmitting antennas TA-1 and TA-2 are different in position, the received signals can be separated. What is more important is that even when transmission signals $x_1$ and $x_2$ are sent from the same antenna, if they are transmitted at different frequencies, their transfer functions in the propagation path differ, and consequently, received signals can be separated.

Transmitting-Station Equipment and Receiving Device

Figure 4:
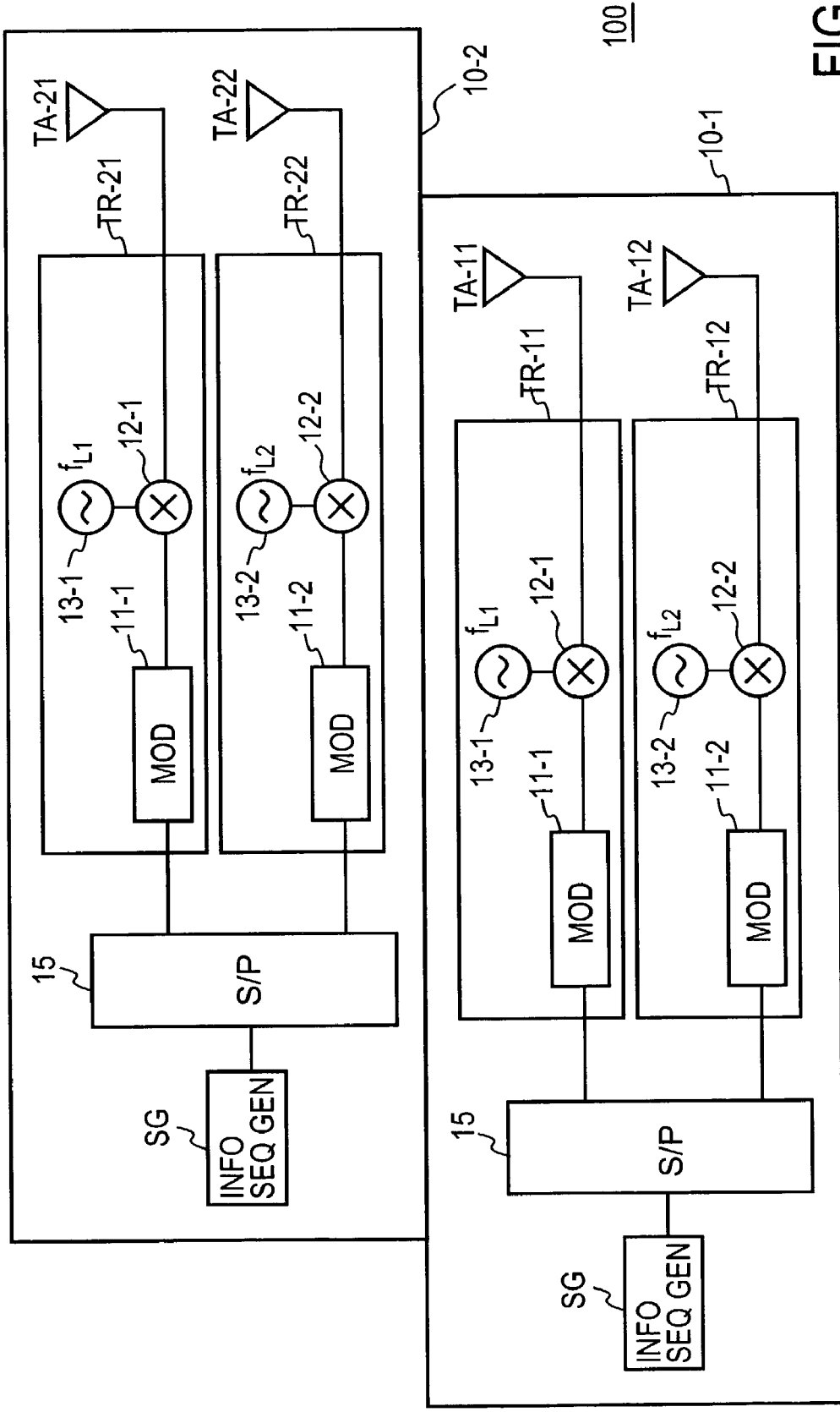
FIG. 4 is a block diagram illustrating an embodiment of transmitting-station equipment according to the present invention.

FIG. 4 illustrates in block form an embodiment of the transmitting-station equipment according to the present invention. Each transmitting device of the transmitting-station equipment 100 includes N transmitters, each of which comprises a modulator and a carrier generator. FIG. 4 shows the case where the number of transmitting device M is two and the number of transmitters N is two. The transmitter TR-11 of the transmitting device 10-1 has a modulator 11-1, a frequency converter 12-1 and a carrier generator 13-1. In the illustrated example, an information sequence from an information sequence generator SG is separated by a serial-to-parallel converter (S/P) 15 into two signal sequences, which are input as different information sequences to the transmitters TR-11 and TR-12, respectively. The other transmitters TR-12, TR-21 and TR-22 are also similarly configured.

The carrier generator 13-1 generates a carrier signal of a preset frequency $f_{L1}$. The output from the modulator 11-1 is up-converted by the frequency converter 12-1 to the carrier frequency $f_{L1}$, and is fed to the transmitting antenna TA-11. The transmitter TR-12 of the same transmitting device 10-1 is identical in construction to the transmitter TR-11 except that it uses a carrier frequency $f_{L2}$ different from that $f_{L1}$. The same combination of preset carrier frequencies $f_{L1}$ and $f_{L2}$ is used for the respective transmitting devices, but the carrier generator may preferably be a variable frequency type so as to deal with any combinations of carrier frequencies.

Figure 5:
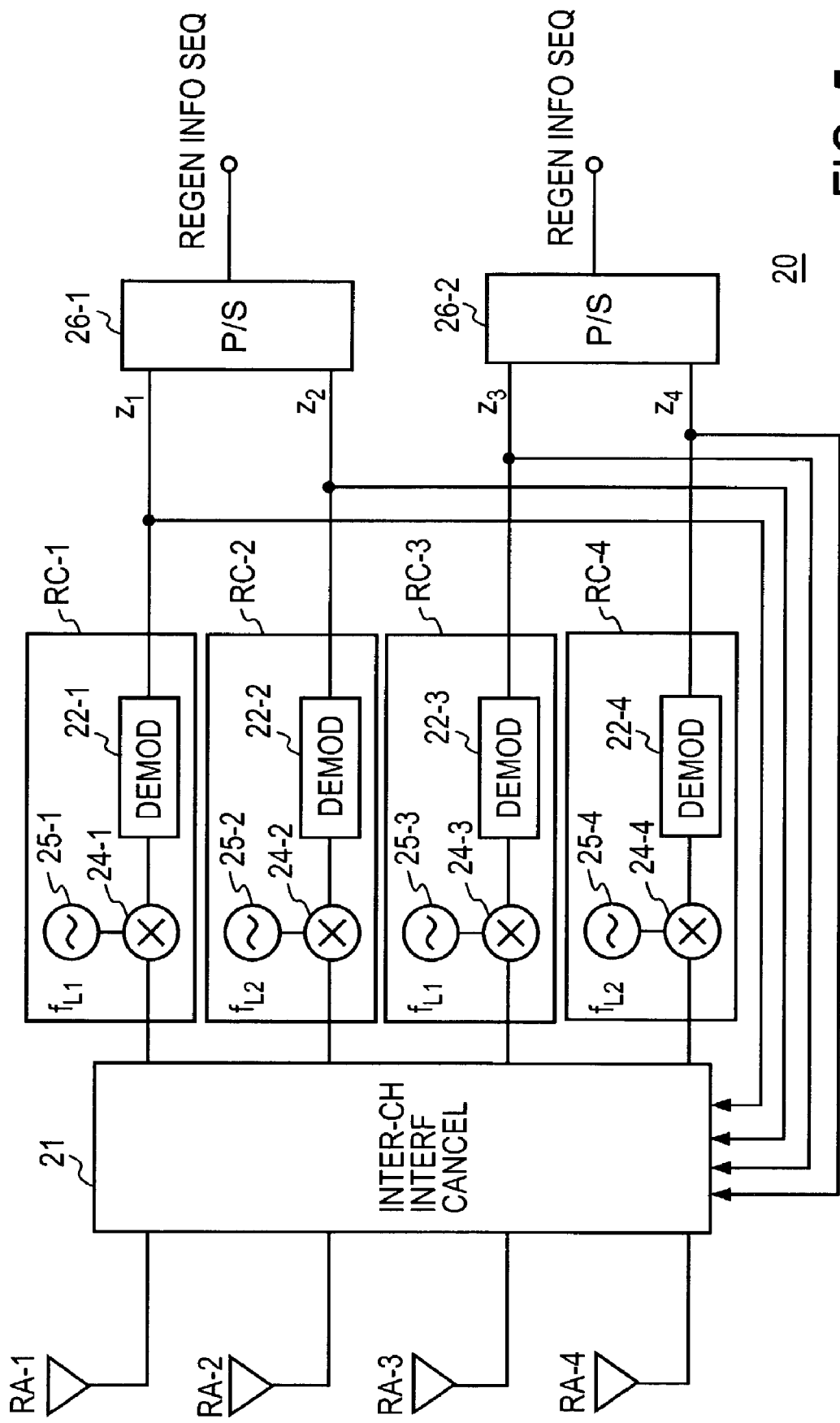
FIG. 5 is a block diagram illustrating an embodiment of a receiving device corresponding to the transmitting-station equipment.

FIG. 5 depicts in block form an example of the receiving device 20 corresponding to the transmitting-station equipment 100 of FIG. 4. The receiving device is shown to have four receiving antenna elements corresponding to the four transmitters in FIG. 4. The signals received by the antenna elements RA-1 to RA-4 are input to the interchannel interference canceller 21. The input signal may be an RF signal, signal down-converted to the IF band, base band signal, or digital signal A/D converted from such a signal; the basic configuration of the interchannel interference canceller does not change with the kind of input signal. The signal components of each information sequence separated by the interchannel interference canceller 21 are provided to the corresponding receivers RC-1 to RC-4, respectively. In the receivers RC-1 to RC-4 generate, local signals of the frequencies $f_{L1}$ and $f_{L2}$ corresponding to the input signals are generated by local signal generators 25-1 to 25-4, and the received signals are converted by frequency converters 24-1 to 24-4 to the intermediate frequency or base band signals. The thus frequency-converted received signals are detected by demodulators 22-1 to 22-4 to regenerate signals $z_1$, $z_2$, $z_3$ and $z_4$, which are applied to parallel-to-serial converters 26-1 and 26-2 to restore the two original information sequences. The detection method by the demodulators 22-1 to 22-4 may be a coherent detection, differential detection, or the like.

Figure 6:
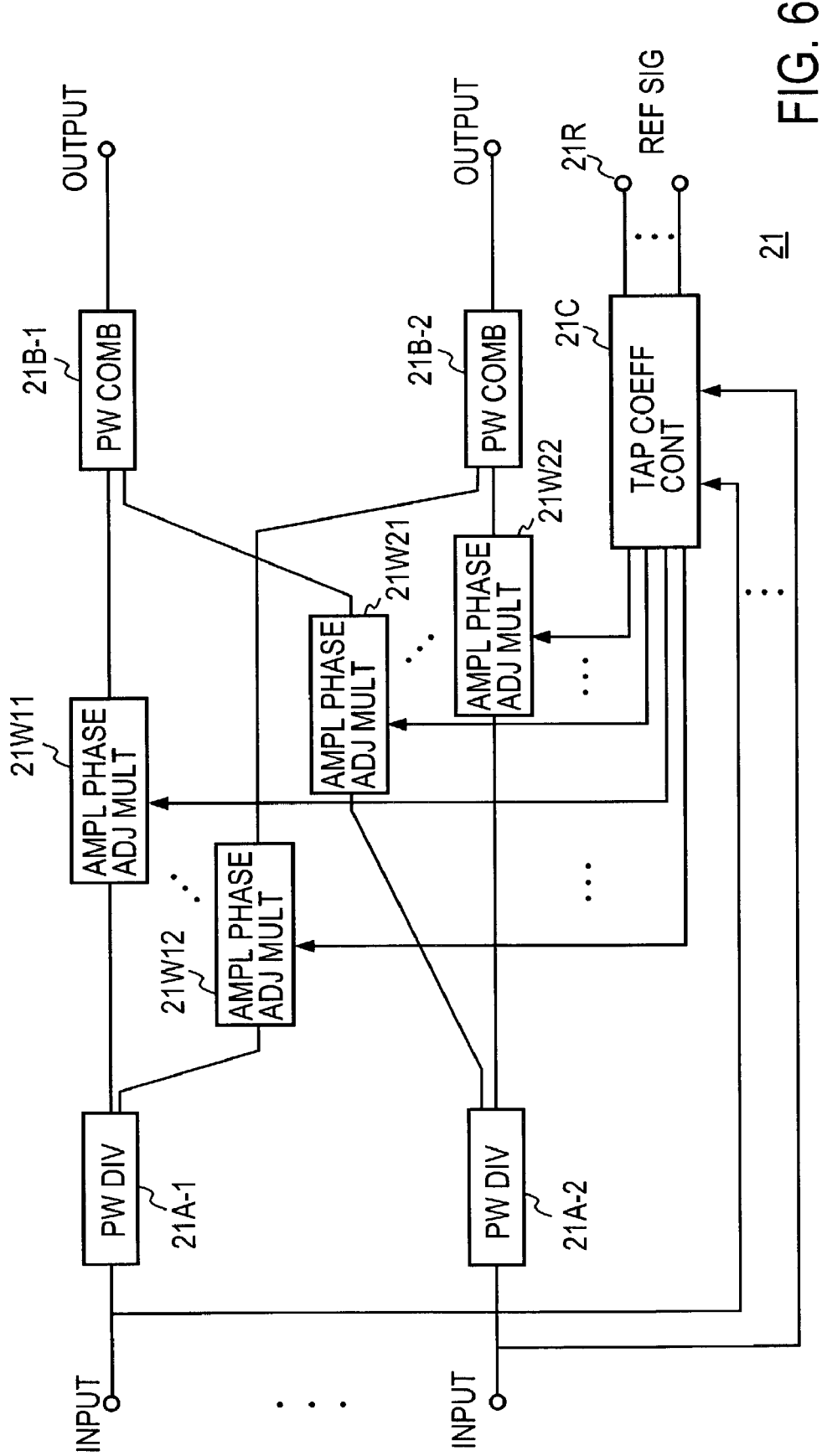
FIG. 6 is a block diagram depicting an embodiment of the interchannel interference canceller in FIG. 5.

FIG. 6 illustrates in block form an example of the interchannel interference canceller 21, in which MN=2. The interchannel interference canceller 21 comprises: power dividers 21A-1 and 21A-2 for power-dividing input received signals from respective antenna elements to the number of all receivers; amplitude phase adjusting multipliers 21W11, 21W12, 21W21 and 21W22 for multiplying the outputs from the power dividers by weighting coefficients (tap coefficients) obtained by an adaptive algorithm for respective input-output paths; power combiners 21B-1 and 21B-2 for combining the amplitude phase modulated input signals; and a tap controller 21C for calculating tap coefficients and applying them to the amplitude phase adjusting multipliers 21W11 to 21W22.

During receiving the training signals, they are applied to terminals 21R and used as reference signals. During receiving the information sequence signal, the demodulated signals from the receivers or decision signals $z_1$ and $z_2$ are fed to the terminals 21R and used as reference signals. Based on these reference signals, the tap coefficient controller 21C adaptively controls the weighting coefficients of the respective paths. The tap coefficient can be adaptively controlled by a conventional algorithm using a peak distortion or least square error criterion.

The initial convergence values of the tap coefficients can be set as in the prior art by using the training signals transmitted from the transmitting side as described previously. This can be implemented by either analog or digital circuits.

In order that phase fluctuations or variations of the carriers used by the transmitters of the transmitting-station equipment 100 may become uniform, it is possible to use carrier generators connected to a local oscillator common to the transmitters of each transmitting device. It is also possible to operate the local oscillators in the respective transmitting devices in synchronism with a common local oscillator. For example, a GPS receiver is built in each transmitting device and a reference signal from a satellite is transmitted to each transmitting device to synchronize the common local oscillator in each transmitting device with the reference signal.

Figure 7:
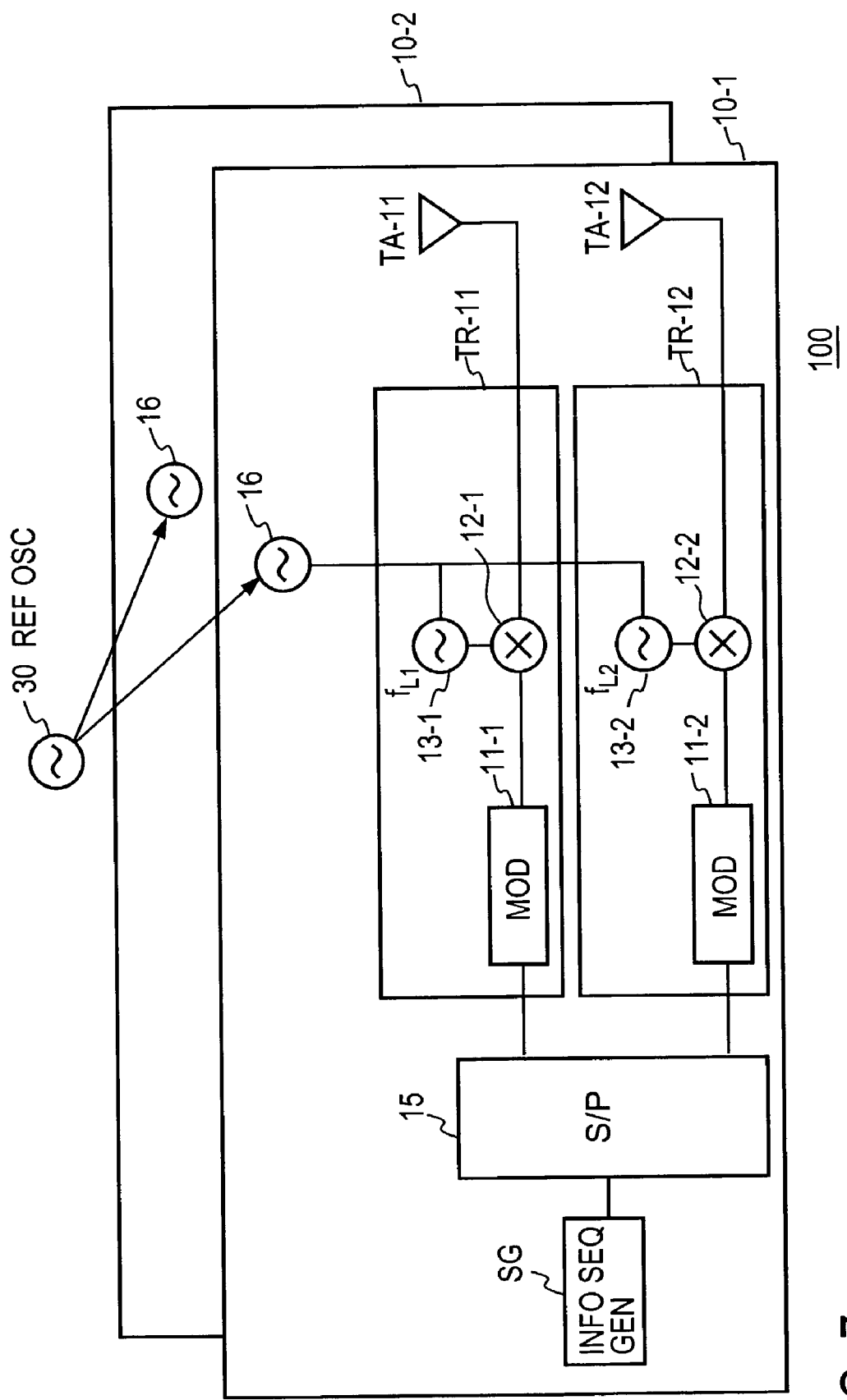
FIG. 7 is a block diagram illustrating another embodiment of the transmitting-station equipment according to the present invention.

An example of such a configuration is shown in FIG. 7, in which the number of transmitting devices M is two. The illustrated example differs from the FIG. 4 example in that the transmitting devices 10-1 and 10-2 are each provided with a local oscillator 16 which generates a local signal in synchronization with a common reference signal generated by a reference oscillator 30. The transmitting device 10-1 provides the local signal from the local oscillator 16 to the carrier generators 13-1 and 13-2 of the transmitters TR-1 and TR-2, causing them to generate carriers of the frequencies $f_{L1}$ and $f_{L2}$ in synchronization with the reference signal. The transmitting device 10-2 is similarly configured. Thus, it is possible to make uniform the phase fluctuations or variations of the carriers among the transmitters TR-1, TR-12, TR21 and TR-22.

Figure 8:
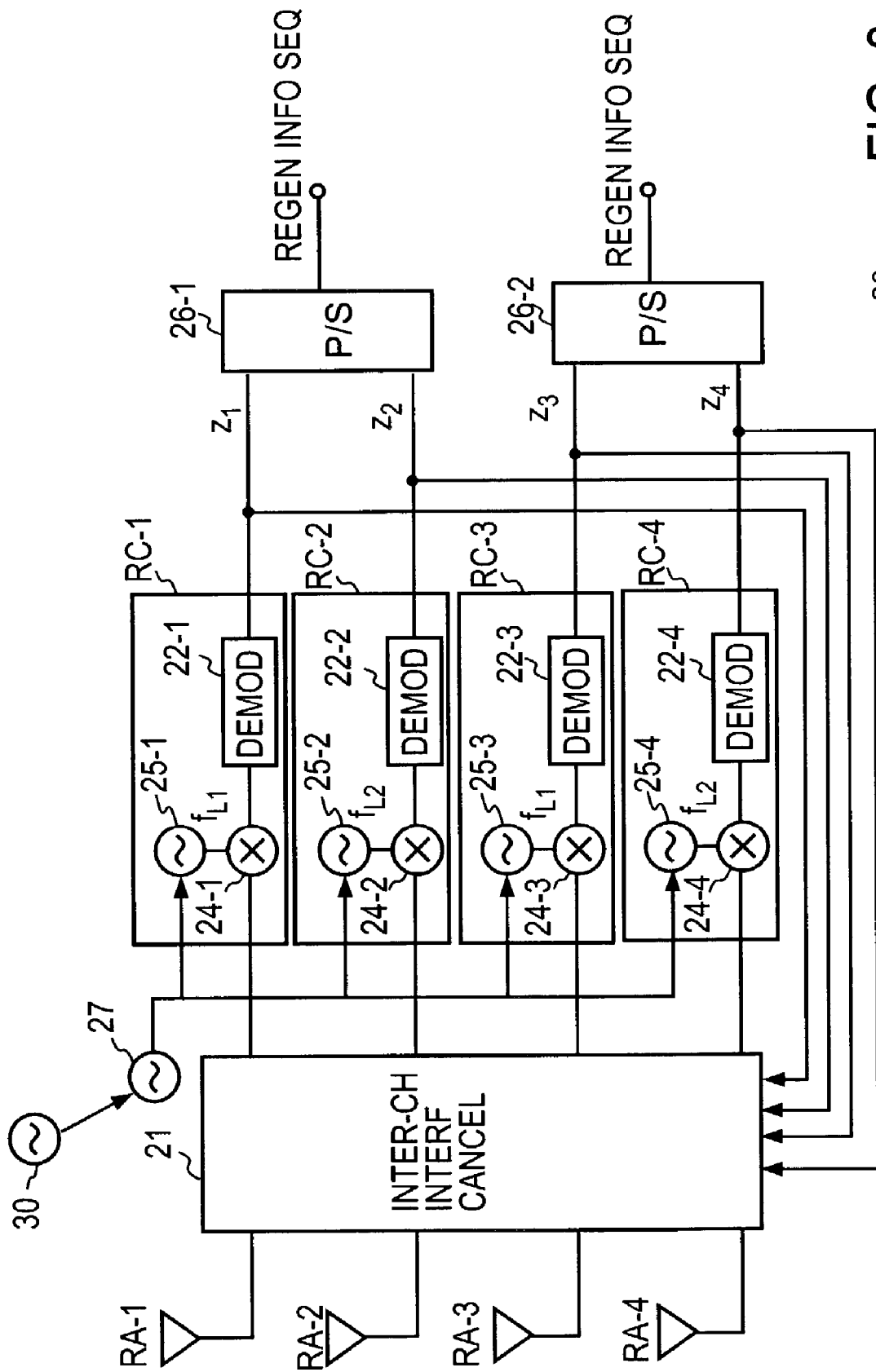
FIG. 8 is a block diagram illustrating an embodiment of the receiving device corresponding to the transmitting-station equipment of FIG. 7.

FIG. 8 illustrates in block form an example of the receiving device 20 corresponding to the transmitting-station equipment of FIG. 7. For the purpose of making uniform the phase fluctuations or variations of the local signal generators 25-1 to 25-4 in the receivers RC-1 to RC-4, a common oscillator 27 is provided to generate a common local signal, which is applied to the local signal generators 25-1 to 25-4, causing them to generate local signals of the frequencies $f_{L1}$ and $f_{L2}$ for down-conversion. In this example, with a view to synchronizing all the local signals of the receiving device with the carriers from the transmitting side, the common local oscillator 27 is so configured as to generate the common local signal in synchronization with the reference signal from the reference oscillator 30 by GPS, for instance. The demodulated signals $z_1$, $z_2$, $z_3$ and $z_4$ from the demodulators 22-1 to 22-4 are fed back to the interchannel interference canceller 21, and they can be used as reference signals. The demodulated signals are applied to the parallel-to-serial converters 26-1 and 26-2 to restore the two original information sequences.

Figure 9:
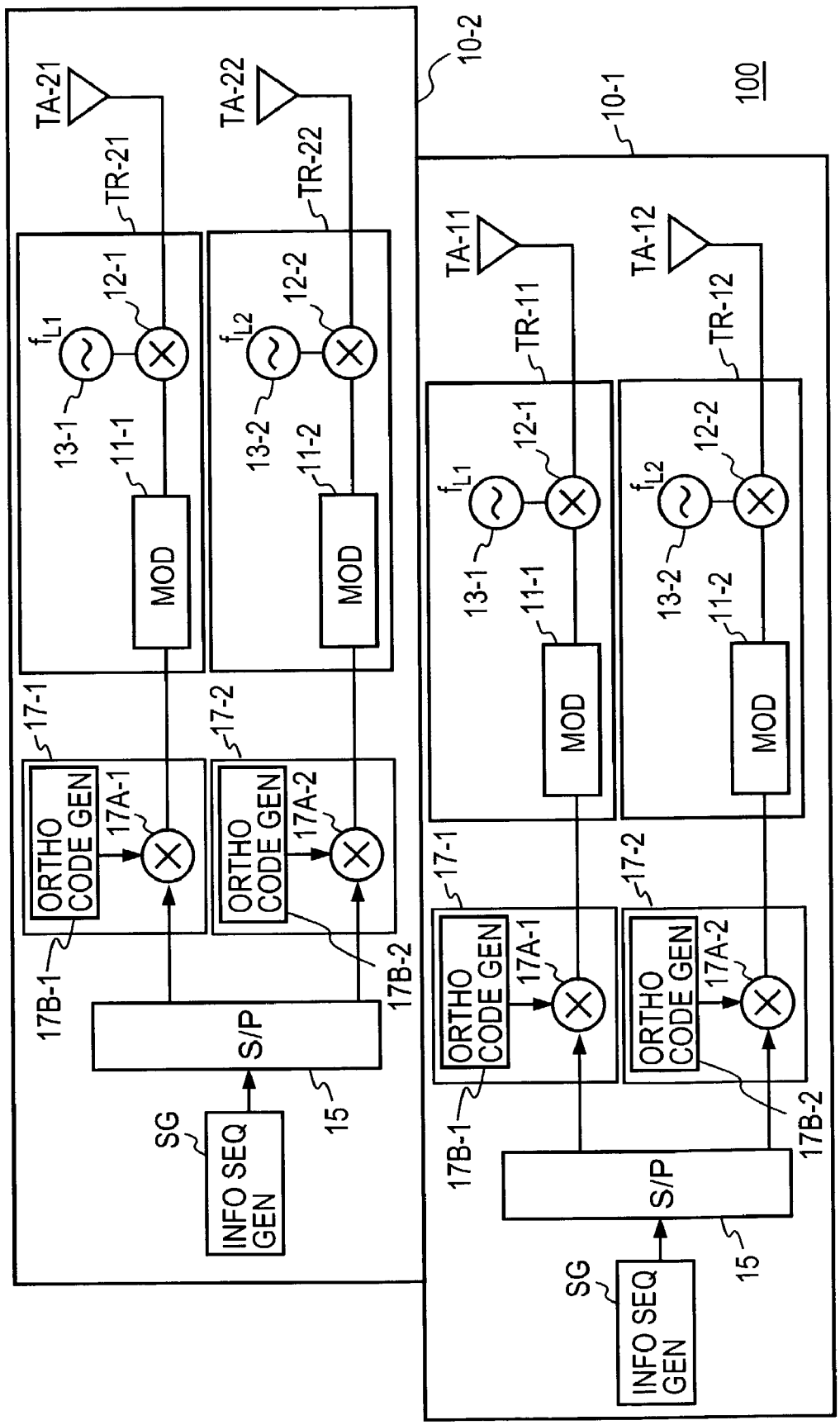
FIG. 9 is a block diagram illustrating another embodiment of the transmitting-station equipment according to the present invention.

The accuracy of signal separation in each receiving device of the transmitting-station equipment 100 shown in FIG. 4 could be increased by use of a convolution coding scheme such as an orthogonal coding or error correcting coding. FIG. 9 depicts a configuration provides increased signal separation accuracy by orthogonal coding. As shown in FIG. 9, orthogonal coders 17-1 and 17-2 are provided in each transmitting device to improve the orthogonality of the transmission signals from the transmitting device. In the transmitting device 10-1 the orthogonal coder 17-1 is composed of a multiplier 17A-1 and an orthogonal code generator 17B-1. The other orthogonal coder 17-2 is also similarly configured. The orthogonal code generators 17B-1 and 17B-2 generate codes that are orthogonal to each other like spreading codes in CDMA communications, and in the multipliers 17A-1 and 17A-2 the information sequences are multiplied by such orthogonal codes, and the multiplied outputs are fed to the transmitters TR-11 and TR-12, respectively. This applies to the transmitting device 10-2. The orthogonal codes are all different from one another. The illustrated embodiment is identical in construction to the FIG. 4 embodiment except the above.

Figure 10:
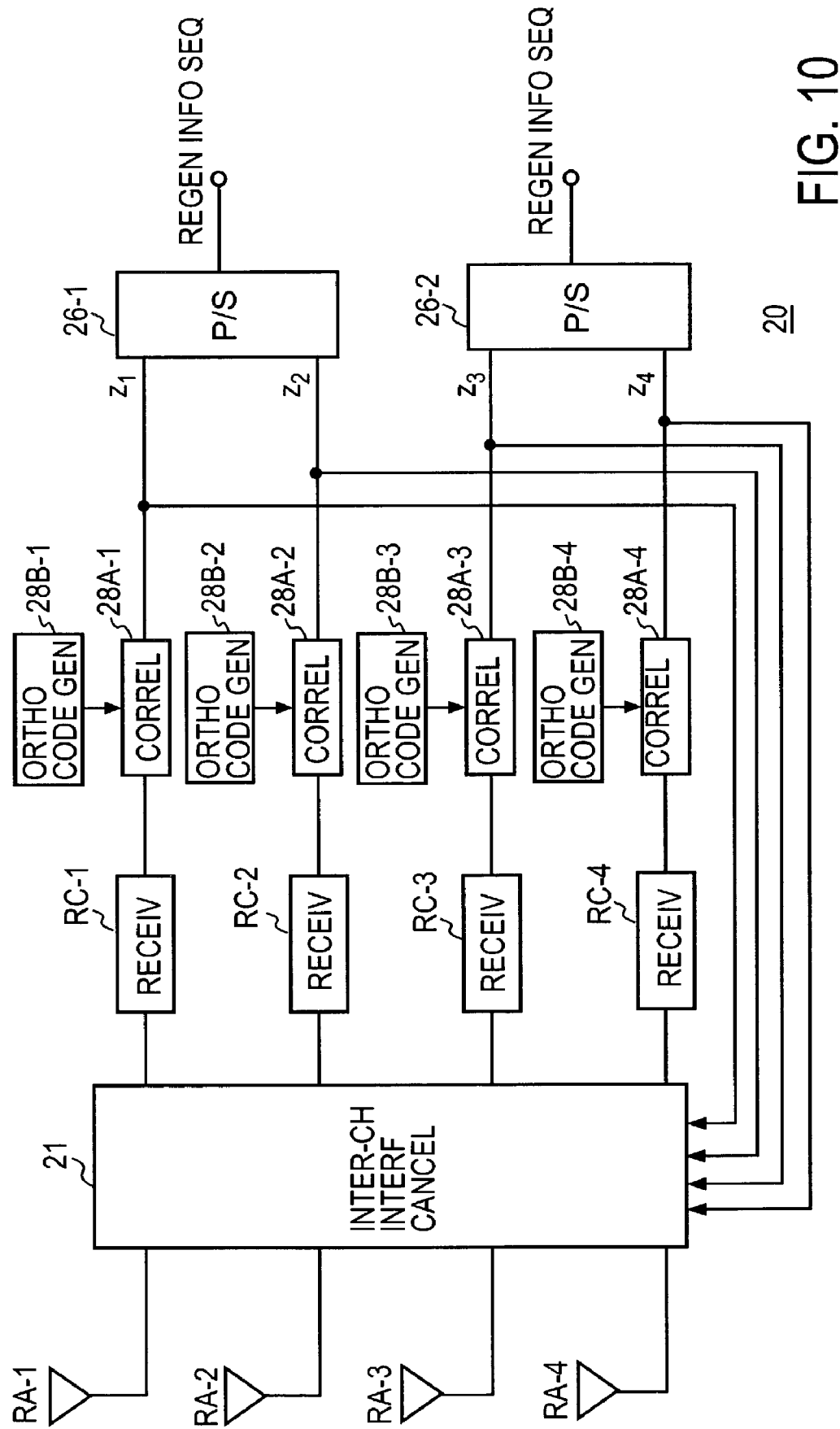
FIG. 10 is a block diagram illustrating an embodiment of the receiving device corresponding to the transmitting-station equipment of FIG. 9.

FIG. 10 depicts the configuration of the receiving device 20 which receives transmission signals rendered into orthogonal codes in the transmitting-station equipment 100 of FIG. 9. Connected to the outputs of the receivers RC-1 to RC-4 are correlators 28A-1 to 28A-4. The correlators 28A-1 to 28A-4 are supplied with the orthogonal codes from orthogonal code generators 28B-1 to 28B-4, respectively, so that they are correlated with the received signals. The orthogonal code generators 28B-1 to 28B-4 generate the same codes as those by the corresponding four orthogonal code generators in FIG. 9, and by correlating them with the received signals, the input signals $z_1$, $z_2$, $z_3$ and $z_4$ superimposed on the orthogonal codes are separated. The illustrated embodiment is identical in construction and operation to the FIG. 5 embodiment except the above. The method described above is like an application of the spread spectrum communication method. Thus, a spreading gain by the sequence length of the orthogonal code can be obtained and the signal discrimination level can be increased accordingly—this permits implementation of more excellent communications even if the interchannel interference remains uncanceled.

Figure 11:
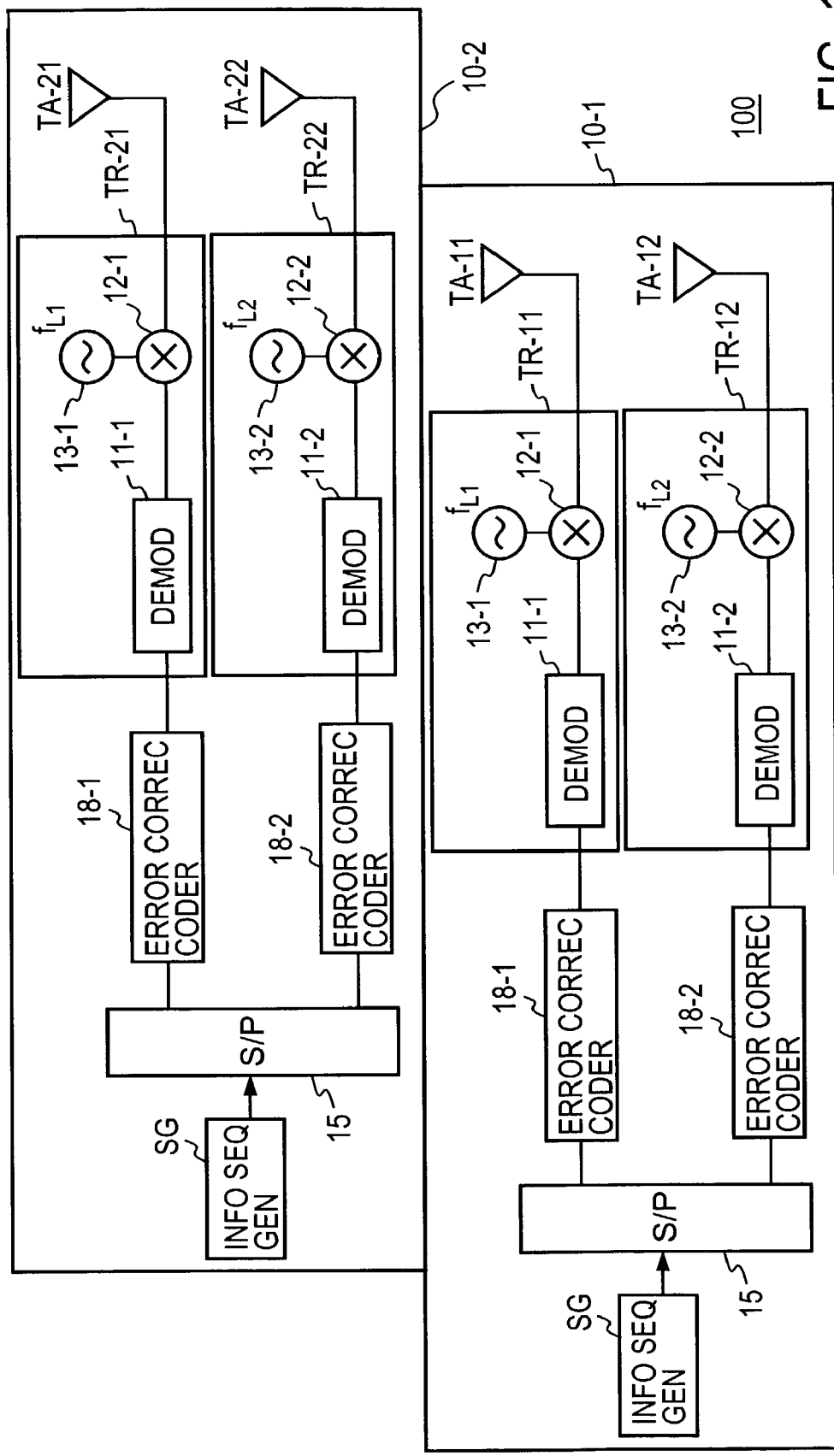
FIG. 11 is a block diagram illustrating another embodiment of the transmitting-station equipment according to the present invention.
Figure 12:
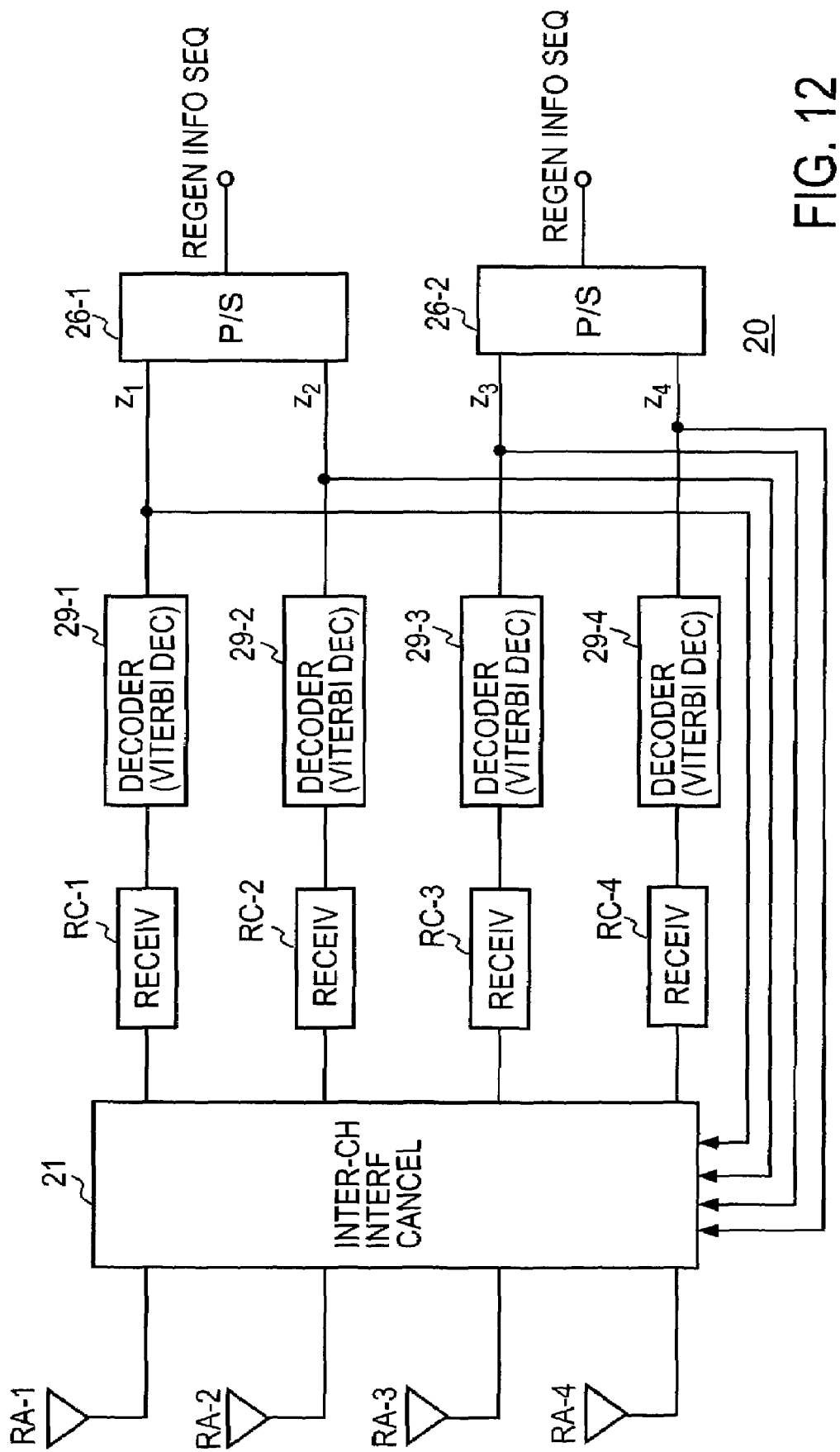
FIG. 12 is a block diagram illustrating an embodiment of the receiving device corresponding to the transmitting-station equipment of FIG. 11.

FIG. 11 illustrates in block form an embodiment of the transmitting-station equipment 100 using the error correcting code scheme, in which the orthogonal coders 17-1 and 17-2 in FIG. 9 are replaced with error correcting coders 18-1 and 18-2. In the transmitting device 10-1 the information sequences to be transmitted are rendered by the error correcting coders 18-1 and 18-2 into error correcting codes, which are input to the transmitters TR-11 and TR-12. The transmitting device 10-2 is also similarly configured. FIG. 12 depicts the configuration of the receiving device 20 corresponding to the transmitting-station equipment 100 of FIG. 11. the illustrated embodiments uses decoders 29-1 to 29-4 as substitutes for the corresponding pairs of correlators 28A-1 to 28A-4 and orthogonal code generators 28B-1 to 28B-4. The outputs from the receivers RC-1 to RC-4 are decoded by the decoders 29-1 to 29-4 to obtain the received signals $z_1$, $z_2$, $z_3$ and $z_4$, which are applied to the parallel-to-serial converters 26-1 and 26-2 to restore the original information sequences.

For example, when convolution coders are used as the coders 18-1 and 18-2 in the transmitting device of FIG. 11 which are combined with the decoders 29-1 to 29-4 in FIG. 12, the signal discrimination level could be raised by using, as the corresponding decoders, such maximum likelihood estimators as Viterbi decoders.

In the above-described embodiments any transmitting antennas can be used, but the cross correlation between the transfer characteristics of the transmission signals could be reduced by using an antenna of different polarization for each transmitting device.

Figure 13:
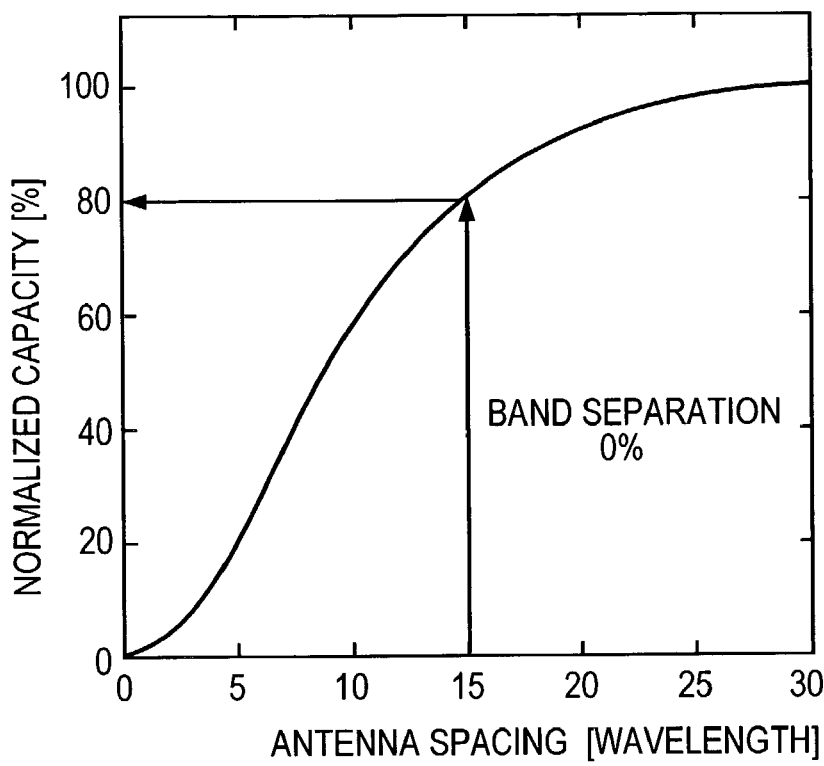
FIG. 13 is a graph showing the relationship between the antenna spacing and the channel capacity obtained as an effect of the present invention.
Figure 14:
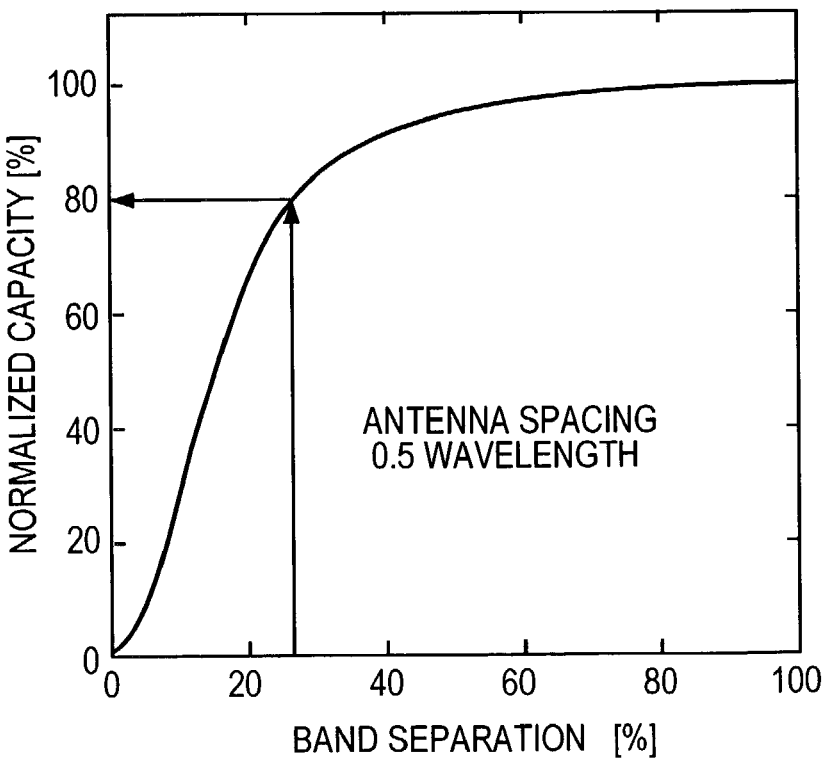
FIG. 14 is a graph showing the relationship between the band separation and the channel capacity obtained as another effect of the present invention.
Figure 15:
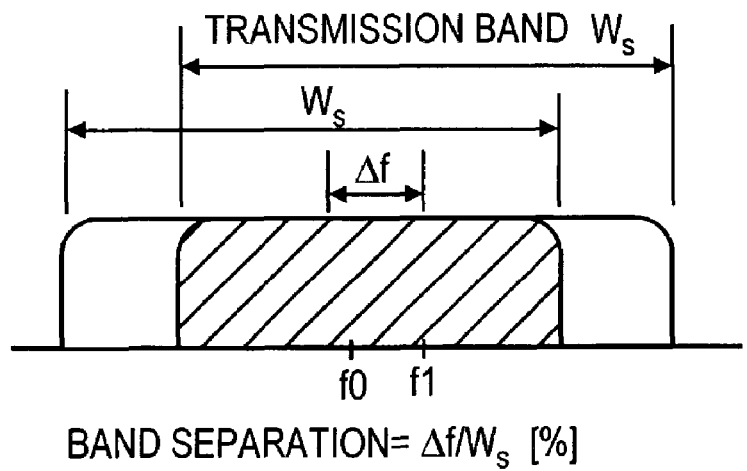
FIG. 15 is a diagram for explaining the band separation.

Referring next to FIGS. 13 and 14, a description will be given of the effects of increased degree of signal separation and enhanced frequency utilization efficiency by slightly displacing the carrier frequencies which are generated in the plural transmitters of each transmitting device. As shown in FIG. 15, the ratio of the difference $\Delta f$ between the center frequency f0 and f1 to the transmission bandwidth Ws is defined as the "band separation." Further, the channel capacity normalized by an ideal channel capacity depending only on the total number of simultaneous transmissions N in a single access (the number of transmitting devices M=1) is defined as the "normalized capacity." FIGS. 13 and 14 both show the case where the number of transmitters N=2. FIG. 13 depicts the normalized capacity with respect to the antenna spacing of the transmitter when the band separation is 0% (when the frequency bands used completely coincide). This suggests that even if the frequency bands of transmission signals from two transmitting antennas completely coincide, the signals could be received separately by providing a sufficiently wide antenna spacing. With an antenna spacing of about 0.5 wavelength, the normalized channel capacity is zero. To achieve a normalized channel capacity of 80% or so, the antenna spacing needs to be around 15 wavelengths. FIG. 14 shows the normalized capacity with respect to the band separation when the transmitting antenna spacing is 0.5 wavelength. Even when the transmitting antenna spacing is as close as approximately 0.5 wavelength, a normalized capacity of 80% can be achieved by shifting the carrier frequencies of the two transmitters from each other until the band separation reaches about 30%.

Figure 16:
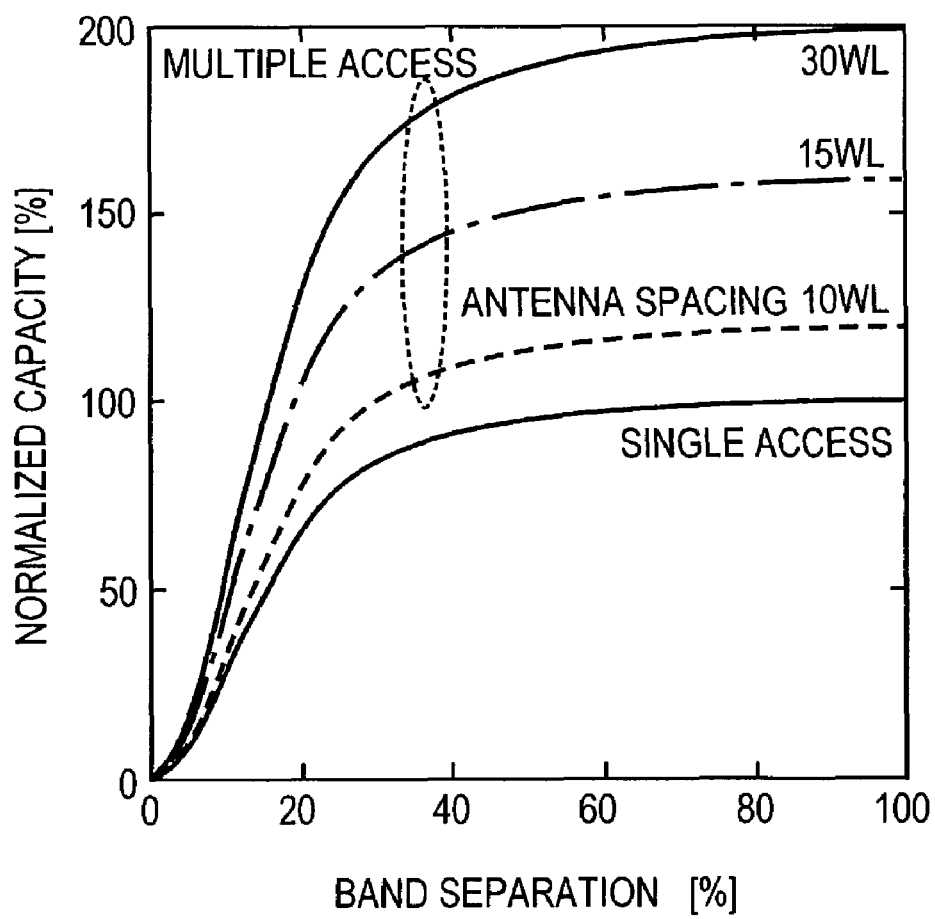
FIG. 16 is a graph showing the relationship between the band separation and the channel capacity, using the transmitting antenna spacing as a parameter.

FIG. 16 shows the normalized capacity with respect to the band separation in the multiple access (the number of transmitting devices M=2), using the transmitting antenna spacing as a parameter. By spacing the transmitting antennas around 30 wavelengths apart, the channel capacity becomes twice larger than in the case of single access. Moreover, the channel capacity decreases with a decrease in the transmitting device spacing.

While FIGS. 13, 14 and 16 show the result s of evaluation obtained when the information sequences are not coded using the orthogonal codes, the characteristics could be further improved by orthogonal coding of the information sequences.

Although the embodiments each have been described to use the receiving array antenna elements equal in number to the information sequences to be separated, that is, to the number of transmitters, the number of array antenna elements may be either smaller or larger. In such a case, the number of power dividers (21A-1 and 21A-2) of the receiving device of FIG. 6 is also made equal to the number of receiving array antenna elements, and each power divider divides the received signal to signals of the same number as that of the information sequences and an amplitude phase adjusting multiplier is inserted in each signal path. When the number of array antenna elements is larger than the number of information sequences, the signal separation characteristic is improved accordingly. When the number of array antenna elements is smaller than the number of information sequences, the signal separation characteristic is degraded accordingly, but it can be improved by using, for example, such an orthogonal coding technique as shown in FIGS. 9 and 10, or such an error correcting code technique as shown in FIGS. 11 and 12.

EFFECT OF THE INVENTION

As described above, according to the present invention, when the carrier frequencies of plural transmitters of the same transmitting device are slightly shifted from each other, even if the transmitting signal frequency bands substantially coincide with each other, the receiving device is able to separate the received signal by plural receiving antennas based on different transfer functions of respective paths. Hence, it is possible (1) to achieve high frequency utilization efficiency by combining multiplexing on the frequency axis and multiplexing on the space axis and (2) to reduce the cross correlation between multiplexed signals by the frequency correlation and the space correlation to provide increased the accuracy of signal separation to thereby achieve high frequency utilization efficiency.

What is claimed is:

1. A receiving device comprising:
an array antenna having about $K=N \times M$ elements for receiving signals transmitted by M sets of N carriers of different frequencies carrying signals respectively modulated by different information sequences and having their signal bands overlapping each other, said N being an integer equal to or greater than 2 and said M being an integer equal to or greater than 1;
an interchannel interference canceller for dividing each of the received signals from said N×M elements of said array antenna to N×M signals, weighting said divided signals, and combining said weighted signals to obtain separated N×M signals;
N×M receivers each having a frequency converter for frequency-converting the separated signal using corresponding one of N different frequencies to an intermediate or baseband signal and a demodulator for demodulating said intermediate or baseband signal; and
a coefficient controller for adaptively controlling weighting coefficients of said interchannel interference canceller based on the combined signals to minimize the cross correlation representing frequency cross-correlation between output signals from said interchannel interference canceller.

2. The receiving device of claim 1, wherein said interchannel interference canceller comprises dividers each for dividing the received signal from each of said K elements of said array antenna to K signals, multipliers for multiplying said K×K divided signals by weighting coefficients, K combiners each for combining each group of K weighted signals from different ones of said K array antenna elements to generate a combined signal and for providing said combined signal to corresponding one of said K receivers.

3. The receiving device of claim 1, further comprising correlators each provided at the output of each of said receivers, for restoring one of said information sequences corresponding to an orthogonal code.

4. The receiving device of claim 1, further comprising decoders each provided at the output of each of said K receivers, for restoring one of said information sequences corresponding to an error correcting code.

5. A method for radio communication between M transmitting devices each having N transmitters and N transmitting antenna elements each connected to the output of a corresponding one of said N transmitters and a receiving device provided with an array antenna having $K=M \times N$ receiving antenna elements and K receivers, wherein M is an integer equal to or greater than 1 and N is an integer equal to or greater than 2, said method comprising the following steps of:
at the transmitting side
(a) modulating, in each of said M transmitting devices, different information sequences in said N transmitters and converting said modulated information sequences at different carrier frequencies, each of transmitting signal bands overlapping at least one of the other transmitting signal bands; and
at the receiving side
(b) receiving plural signals by said K receiving antenna elements;
(c) processing said received signals to minimize the cross correlation between said processed output signals and separating respective information sequence signal components from said received signals; and
(d) frequency-converting each of said separated information sequence signal components by corresponding one of N different frequencies to an intermediate or baseband signal and demodulating said intermediate or baseband signal to restore the original information sequence;
wherein said step (c) comprises:
dividing the received signal from each of said K elements of said array antenna to K signals;
multiplying said K×K divided signals by weighting coefficients;
combining each group of K weighted signals corresponding to different ones of said K array antenna elements to generate a combined signal; and
adaptively updating weighting coefficients based on said combined signals, thereby minimizing the cross correlation representing frequency cross-correlation between the processed output signals.

6. The method of claim 5, wherein M transmitting devices are provided at intervals at the transmitting side, and wherein step (a) comprises transmitting by each of said N transmitters of each of said M transmitting devices N different information sequences by using the same set of different carrier frequencies, and step (b) comprises receiving at the receiving side transmitted signals by N×M receiving antenna elements.

7. The method of claim 5, which includes a step of transmitting a known training signal from each of said transmitters, and said step (c) includes a step of pre-receiving said training signal by said receiving antenna element of each receiving device, minimizing said cross correlation by using a known training signal sequence as a reference signal, and separating said information sequences from the subsequently received information sequence signals.

8. The method of claim 5, wherein said step (a) includes the steps of:
(a-1) coding different information sequences by different orthogonal codes in plural transmitters of each of said transmitting devices; and
(a-2) modulating the coded outputs and transmitting said modulated outputs at different carrier frequencies with transmitting signal bands overlapping each other; and
said step (d) further includes a step of restoring said information sequences by detecting the correlation between said modulated signals and said orthogonal codes.

9. The method of claim 5, wherein said step (a) includes the steps of:
(a-1) coding different information sequences by error correcting codes in plural transmitters of each of said transmitting devices; and
(a-2) modulating the coded outputs and transmitting said modulated outputs at different carrier frequencies with transmitting signal bands overlapping each other; and
said step (d) further includes a step of restoring said information sequences by subjecting said demodulated signals to decoding corresponding to said error correcting codes.

10. The method of claim 6, which includes a step of transmitting a known training signal from each of said transmitters, and said step (c) includes a step of pre-receiving said training signal by said receiving antenna element of each receiving device, minimizing said cross correletion by using a known training signal sequence as a reference signal, and separating said information sequences from subsequently received information sequence signals.

11. The method of claim 6, wherein said step (a) includes the steps of:
(a-1) coding different information sequences by different orthogonal codes in plural transmitters of each of said transmitting devices; and
(a-2) modulating the coded outputs and transmitting said modulated outputs at different carrier frequencies with transmitting signal bands overlapping each other; and
said step (d) further includes a step of restoring said information sequences by detecting the correlation between said modulated signals and said orthogonal codes.

12. The method of claim 6, wherein said step (a) includes the steps of:
(a-1) coding different information sequences by error correcting codes in plural transmitters of each of said transmitting devices; and
(a-2) modulating the coded outputs and transmitting said modulated outputs at different carrier frequencies with transmitting signal bands overlapping each other; and
said step (d) further includes a step of restoring said information sequences by subjecting said demodulated signals to decoding corresponding to said error correcting codes.

* * * * *